United States Patent
Kay (10) Patent No.: US 11,230,174 B2
(45) Date of Patent: Jan. 25, 2022

(54) LUGGAGE STORAGE

(71) Applicant: McLaren Automotive Limited, Woking (GB)

(72) Inventor: Andrew Kay, Woking (GB)

(73) Assignee: McLaren Automotive Limited, Horsell (GB)

( * ) Notice: Subject to any disclaimer, the term of this patent is extended or adjusted under 35 U.S.C. 154(b) by 139 days.

(21) Appl. No.: 16/678,130

(22) Filed: Nov. 8, 2019

(65) Prior Publication Data

US 2020/0148047 A1    May 14, 2020

(30) Foreign Application Priority Data

Nov. 9, 2018  (GB) .................................. 1818323

(51) Int. Cl.
*B60J 7/20* (2006.01)
*B60J 7/16* (2006.01)
*B60R 5/04* (2006.01)
*B62D 25/08* (2006.01)
*B60K 5/00* (2006.01)

(52) U.S. Cl.
CPC ............... *B60J 7/20* (2013.01); *B60J 7/1607* (2013.01); *B60J 7/1692* (2013.01); *B60R 5/04* (2013.01); *B62D 25/087* (2013.01); *B60K 2005/003* (2013.01)

(58) Field of Classification Search
CPC .......... B60J 7/20; B60J 7/1607; B60J 7/1692; B60R 5/04; B62D 25/087
USPC ....................................... 296/107.08, 107.17
See application file for complete search history.

(56) References Cited

U.S. PATENT DOCUMENTS

| 5,584,522 A * | 12/1996 | Kerner .................. B60J 7/145 296/108 |
| 6,481,773 B1 * | 11/2002 | Salani .................. B60R 5/04 224/404 |
| 7,621,583 B2 * | 11/2009 | Fallis, III ............. B60J 1/183 296/107.08 |
| 2002/0047032 A1 * | 4/2002 | Schlecht ................ B60R 7/02 224/544 |
| 2008/0231070 A1 * | 9/2008 | Sansome ............... B60J 7/202 296/107.15 |
| 2010/0072775 A1 * | 3/2010 | Tanoi .................... B60J 7/205 296/107.08 |
| 2018/0037099 A1 | 2/2018 | Rossetti |
| 2018/0290597 A1 * | 10/2018 | Mejia Perez .......... F16B 5/121 |

(Continued)

FOREIGN PATENT DOCUMENTS

| DE | 19517063 | 6/1996 |
| DE | 19706444 | 6/1998 |

OTHER PUBLICATIONS

GB1818323.6, Search Report Under Section 17(5) dated May 9, 2019, 5 pages.

*Primary Examiner* — Jason S Morrow
(74) *Attorney, Agent, or Firm* — Kilpatrick Townsend & Stockton LLP (57) ABSTRACT

A vehicle comprising: a passenger compartment; a roof moveable between a first, closed position in which it covers at least part of the passenger compartment and a second, stowed position in which it does not cover the passenger compartment; and a floor located so as to face the underside of the roof when the roof is in the stowed position, the floor being adapted to define a luggage space between it and the roof when the roof is in the stowed position.

16 Claims, 4 Drawing Sheets

(56) References Cited

U.S. PATENT DOCUMENTS

| | | | | |
|---|---|---|---|---|
| 2018/0345770 A1* | 12/2018 | Podolski | ................ | B60R 5/045 |
| 2020/0062159 A1* | 2/2020 | Nur | ........................ | B60R 7/02 |
| 2020/0148045 A1* | 5/2020 | Sanham | ................ | B60J 7/1204 |

* cited by examiner

LUGGAGE STORAGE

This application claims priority to GB Application No. 1818323.6 filed Nov. 9, 2018, and entitled "Luggage Storage," the entirety of which is incorporated herein by reference.

This invention relates to the storage of luggage in a vehicle.

When buyers are choosing a vehicle, an important point to consider can be how much luggage the vehicle can accommodate. Front-engined automobiles typically have a luggage space in the rear of the vehicle, accessed by an exterior door behind the passenger cabin. Rear-engined or mid-engined vehicles typically have a luggage space in the front of the vehicle, accessed by an exterior door ahead of the passenger cabin.

The height of a front luggage space is restricted because the vehicle's driver needs to see out over it. Also, a front luggage space is normally defined between the vehicle's front wheels. These factors normally limit the volume that is available in a front luggage space. For that reason, vehicles that rely on a front luggage space can be restricted in the luggage volume that they provide.

It would be advantageous to provide for an additional luggage space in a vehicle such as an automobile.

According to the present invention there is provided a vehicle comprising: a passenger compartment; a roof moveable between a first, closed position in which it covers at least part of the passenger compartment and a second, stowed position in which it does not cover the passenger compartment; and a floor located so as to face the underside of the roof when the roof is in the stowed position, the floor being adapted to define a luggage space between it and the roof when the roof is in the stowed position.

The passenger compartment may comprise seating for passengers. The passenger compartment may be that interior region of the vehicle that can be accessed by an occupant of the vehicle when the roof is closed.

The floor is provided with one or more reinforcements for supporting an article of luggage in the luggage space. Each reinforcement may be a rib extending under a laminar structure that defines the upper surface of the floor. The floor may be flat. The floor may define a recess for at least partially receiving an article of luggage. The recess having laterally directed walls for restraining an article of luggage at least partially received in the recess against lateral motion with respect to the vehicle. The item of luggage may be sized and shaped to fit snugly in the recess. The recess is spaced from the periphery of the floor. The floor may comprise a first flat region defining the base of the recess, and a second generally flat region surrounding the recess and raised with respect to the first generally flat portion.

The vehicle may comprise a restraint extending rigidly upwards from the floor for engaging an item of luggage received in the luggage space to thereby restrain the item of luggage against lateral motion with respect to the vehicle. The restraint may take the form of a laterally extending wall for engaging an item of luggage received in the luggage space to restrain the item of luggage against vertical motion with respect to the vehicle. The restraint may take the form of a latch mechanism or a clip, claw or arm for engaging an article of luggage.

The vehicle may comprise a latch mechanism mounted to the floor. The latch mechanism may comprise a clasp moveable with respect to the floor for clasping an item of luggage against the floor when the clasp is in a first configuration. The clasp may have a second configuration in which a portion of the clasp extends into the luggage space for obstructing an item of luggage from being located home in the luggage space.

The roof may be mounted to the body of the vehicle by a mechanism such that the underside of the roof when the roof is in its closed position is also the underside of the roof when it is in its stowed position. The vehicle may be configured so that the roof does not undergo inversion on moving between its closed and stowed positions.

The underside of the roof in its closed and in its stowed configurations may be generally concave.

According to a second aspect there is provided a vehicle as set out above, comprising a first user-actuable control and a second user-actuable control, the vehicle being configured to, when the roof is closed: in response to actuation of the first user-actuable control, open a cover of the luggage space and stow the roof; and in response to actuation of the second user-actuable control, open a cover of the luggage space without stowing the roof. The first and second user-actuable controls may be provided by different positions that can be adopted by a user control element such as a rotary knob or a switch lever. The first and second user-actuable controls may be provided as touch-sensitive regions of a touch screen. The touch-sensitive regions may perform other functions in other operating modes of the vehicle. The cover may be attached to the body of the vehicle by a joint located behind the luggage space. The joint may permit rotation and optionally translation. The joint may be a revolute joint. The joint may be a four-bar linkage. The cover may be provided with an actuator whereby its motion relative to the vehicle can be driven. The roof may be provided with an actuator whereby its motion relative to the vehicle can be driven. The cover may be configured to cover the roof when the roof is stowed. The cover may be configured to cover the luggage space when it is closed. The cover may be capable of adopting the same closed position to enclose the luggage space whether the roof is stowed or not.

The luggage space may be located behind the passenger compartment.

The vehicle may be a mid-engined or rear-engined automobile Alternatively, it may be a front-engined automobile.

According to a third aspect there is provided a set of travel equipment comprising: a vehicle as claimed in any preceding claim; and an item of luggage configured to be accommodated in the luggage space.

The item of luggage may be hard-sided. It may be configured so that it nests with the roof when the item of luggage is located home with respect to the floor in the luggage space and the roof is in its stowed configuration.

The item of luggage may be configured so that when it is located home with respect to the floor and the roof is in its stowed configuration the vertical spacing between the upper surface of the item of luggage and the underside of the roof is between 5 mm and 20 mm over the majority of the upper surface of the item of luggage.

According to a fourth aspect there is provided the use, for the purpose of storing an item of luggage, of a volume defined between a stowed roof of a vehicle and a floor located beneath the stowed roof.

According to a fifth aspect there is provided a method for storing an item of luggage in a vehicle as set out above, the method comprising storing the item of luggage in the luggage space.

The present invention will now be described by way of example with reference to the accompanying drawings. In the drawings.

Figure 1:
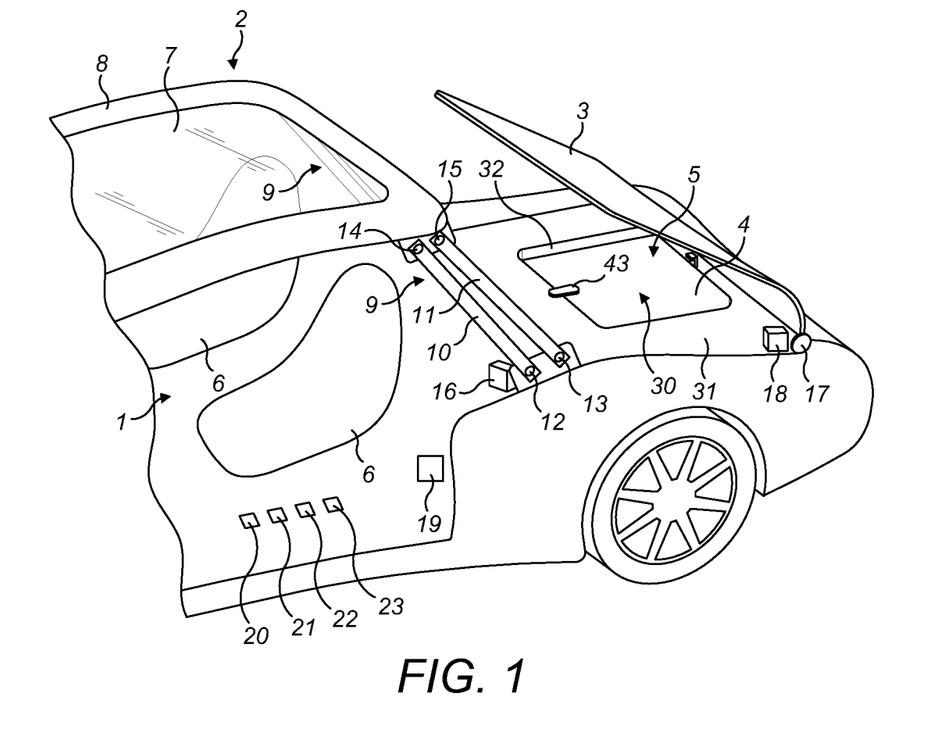
FIG. 1 is a view of a rear region of a vehicle from above and one side.
Figure 2A:
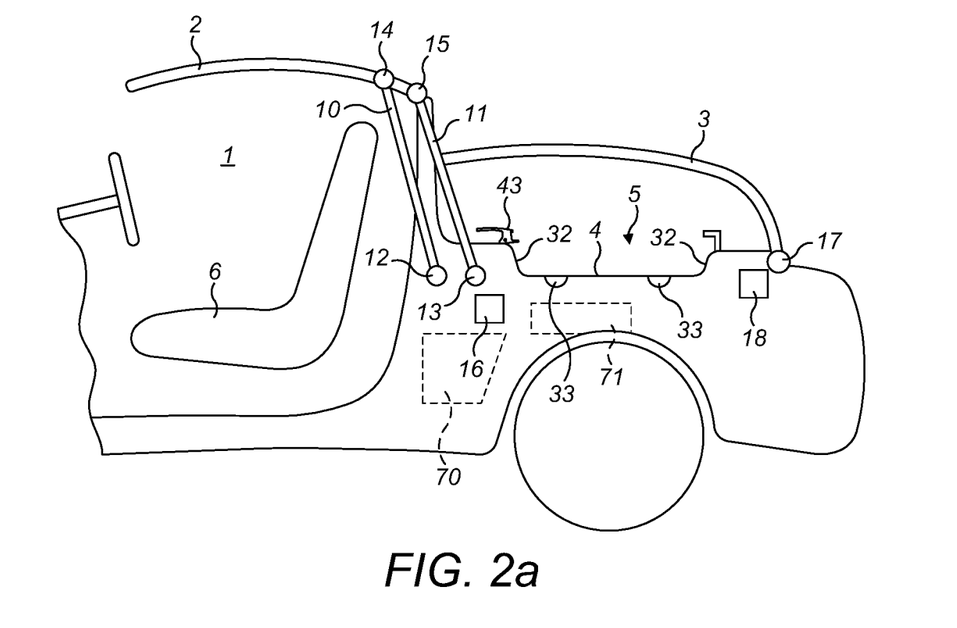
FIG. 2a is a cross-section of a rear region of a vehicle showing no item of luggage and a roof in a raised position.
Figure 2B:
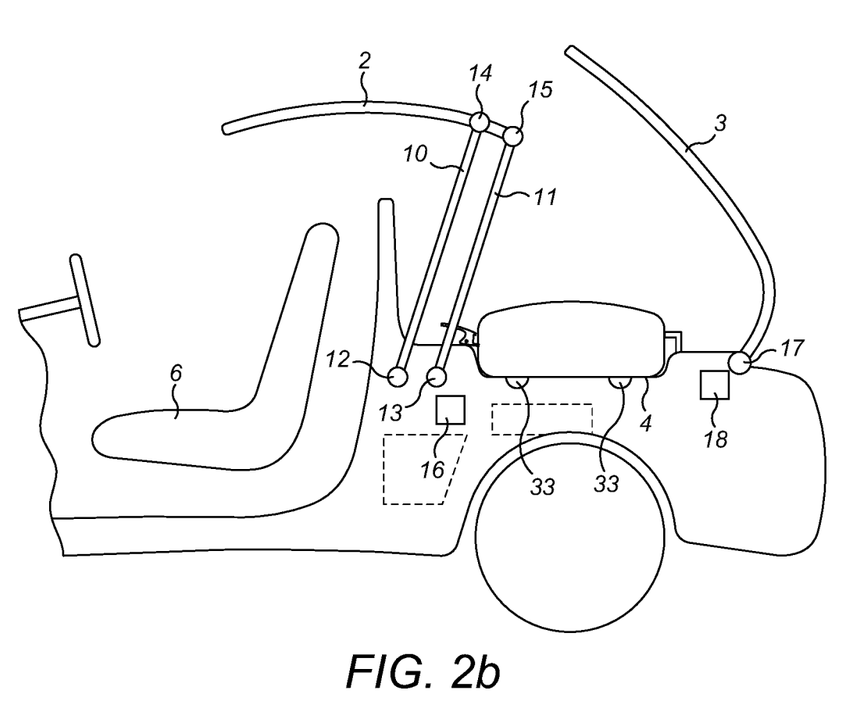
FIG. 2b is a cross-section of a rear region of a vehicle showing an item of luggage in place with a roof in an intermediate position.
Figure 2C:
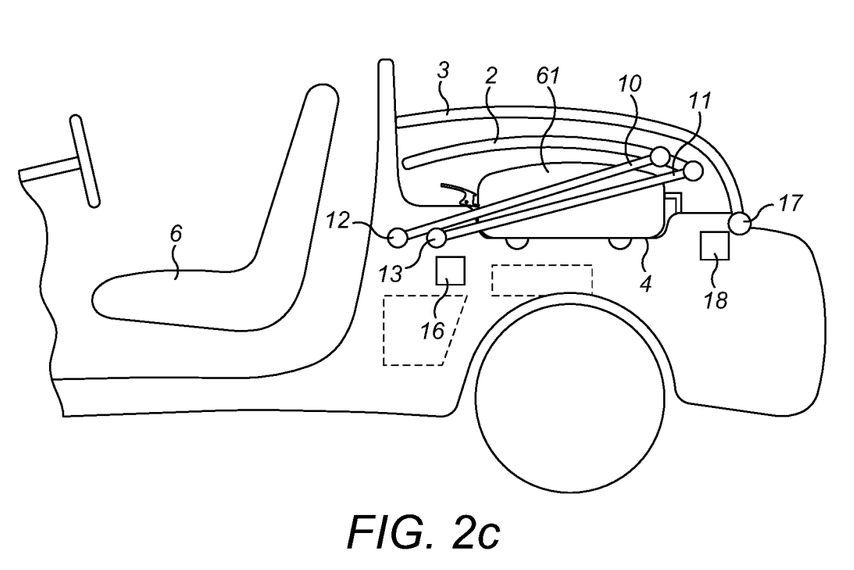
FIG. 2c is a cross-section of a rear region of a vehicle showing an item of luggage in place in a luggage space with a roof in a stowed position.

FIGS. 1 and 2 show the rear region of a vehicle. The vehicle has a passenger compartment 1 and a roof 2 which can cover the passenger compartment. (See FIG. 2a). The roof can be moved so as to open the passenger compartment. The roof can then be stowed to the rear of the passenger compartment under a tonneau cover 3. (See FIG. 2c). The tonneau cover is an exterior panel of the vehicle which closes the space where the roof can be stowed. When the roof is stowed it rests over a floor 4. The roof 2 and the floor 4 cooperate to define a luggage space 5 between them when the roof is stowed. The luggage space has a volume for receiving an item of luggage such as a suitcase, and a mechanism (as will be described with reference to FIGS. 5 and 6) for restraining an item of luggage when it is in place in the luggage space, conveniently by a latching engagement between the vehicle and the item of luggage.

The passenger compartment 1 has one or more seats 6 in which a driver or a passenger of the vehicle can sit when the vehicle is in operation. One of the seats may define a driving position of the vehicle. The driving position may be equipped with a steering wheel. There may be one, two or more rows of seats.

When the roof 2 is closed (see FIG. 2a) it covers at least part of the passenger compartment. The roof is generally in the form of a panel. It may be rigid (sometimes referred to as a hard-top) or flexible (sometimes referred to as a soft-top). The roof may include a transparent portion 7, e.g. of glass, for letting light into the cabin. The transparent portion may be surrounded by a frame 8. Over the majority of its area the roof may be convex upwards—i.e. its upper surface being generally convex. This can provide a smooth profile to the exterior of the vehicle and help reduce the vehicle's drag. When the roof is in the form of a panel or sheet and is convex upwards over the majority of its area, it is convenient for the roof to correspondingly be concave downwards over the majority of its area—i.e. its lower surface being generally concave. This can help to improve headroom in the cabin when the roof is closed.

The roof is mounted to the body of the vehicle on a mechanism shown generally at 9. The mechanism permits the roof to move from the closed position (see FIG. 2a) to the stowed position (see FIG. 2c). The mechanism may take any suitable form. It may define any convenient combination of rotation and translation to cause the roof to move between the closed and stowed positions. In the example of FIGS. 1 and 2, the mechanism comprises a multi-bar linkage. On each side of the vehicle a pair of swing arms extend between the vehicle body and the roof. The swing arms 10, 11 and their associated parts on only one side of the vehicle are labelled in FIGS. 1 and 2. The swing arm mechanism on the other side of the vehicle is a mirror image. The swing arms are attached to the vehicle body by respective revolute joints 12, 13 and to the roof by revolute joints 14, 15. When the roof is retracted towards its stowed position, the swing arms rotate rearwardly about joints 12, 13. The swing arms may define a parallelogram linkage, so that the attitude of the roof as it retracts remains substantially constant. Motion of the swing arms may be driven by a motor 16 coupled at one of the joints 12, 13. The mechanism by which the roof is mounted to the vehicle body may be such that the top surface of the roof remains upwards throughout the retraction operation. In other words, the roof might not be inverted during the retraction operation. When the underside of the roof is concave, this can result in that concavity facing downwards when the roof is stowed. This can help to improve luggage volume, as will be described further below.

The tonneau cover 3 is a panel which defines a rear deck of the vehicle. The tonneau cover may extend generally horizontally when in its closed position as shown in FIGS. 2a and 2c. The tonneau cover is mounted to the body of the vehicle by a mechanism which permits the tonneau cover to be raised to a raised position as shown in FIG. 2b. This mechanism may take any convenient form. In the example of the figures, the tonneau cover is mounted to the vehicle body by a revolute joint 17 at the rear of the tonneau cover. A motor 18 is coupled at joint 17. The motor can be activated to raise the tonneau cover (i.e. to cause it to move from the closed condition shown in FIG. 2a to the raised condition shown in FIG. 2b) or to lower the tonneau cover (i.e. to cause it to move from the raised condition shown in FIG. 2b to the closed condition shown in FIG. 2c).

Floor 4 lies under the tonneau cover. When the tonneau cover is closed, a volume is defined between the tonneau cover and the floor. The tonneau cover and the volume defined beneath it are configured so that the roof can be retracted into that volume. Initially, the roof is in the raised or closed position as shown in FIG. 2a. An occupant of the vehicle can initiate a roof opening procedure, for example by pressing a switch in the vehicle's cabin. The roof opening procedure comprises the following steps:

(a) The tonneau cover is raised. This opens the volume under the tonneau cover so it can be entered by the roof.

(b) The roof is retracted into the space above the floor 4. FIG. 2b illustrates the condition of the vehicle part-way through this step.

(c) The tonneau cover is closed, shutting the volume under the tonneau cover with the roof inside it.

To close the roof, the steps are performed in the opposite order. Steps (a) and/or (c) may overlap step (b). This may reduce the time taken to close or open the roof.

At least part of the roof, when retracted, is spaced from the floor. This defines a space 5 that can hold luggage. It may be convenient for the entire roof when retracted to be spaced from the floor. This can prevent the roof knocking on the floor when the vehicle encounters a bump. Alternatively, the periphery of the roof may sit on one or more buffers that extend from or are otherwise in fixed spatial relationship to the floor.

When the roof is retracted (see FIG. 2c) the roof is partially, mainly or wholly located directly between the tonneau cover 3 and the floor 4. When the roof is in its retracted state greater than 50% or greater than 75% or greater than 90% of the area of the roof as projected on to the vehicle's X-Y plane may be located (i) over the floor and/or (ii) under the tonneau cover when it is closed. This can facilitate the retraction of the roof and can contribute to the accessibility of the volume that is under the roof when the roof is closed. When the roof is retracted, the underside face of the roof (i.e. the underside when the roof is in its retracted state) faces the floor 4. A luggage space 5 is defined between the retracted roof and the floor. The luggage space is adapted to receive luggage, as will be described further below. A user of the vehicle can stow luggage in the luggage space by first raising the tonneau cover (e.g. by operating motor 18) and also the roof 2 if it is in the stowed configuration. This opens and exposes the luggage space so that it can be accessed through an opening created by the lifting of the tonneau cover. The user can then deposit luggage in the luggage space. Then the user can return the roof to its retracted position (if necessary) and can close the tonneau cover. The vehicle may have a control unit 19 which controls the operation of the motors 16, 18 for driving the roof and tonneau cover mechanisms. The control unit may be configured through software and/or hardware to cause the motors to undergo predetermined routines. These routines may include the following:

1. A roof retracting routine. This routine involves raising the tonneau cover, retracting the roof and closing the tonneau cover.
2. A roof closing routine. This routine involves raising the tonneau cover, closing the roof and closing the tonneau cover.
3. A luggage space exposing routine. This involves raising the tonneau cover and, if the roof is retracted at the start of the operation, automatically moving the roof at least partially towards its closed position so as to render the luggage space accessible from the exterior of the vehicle. If the roof was closed at the start of the operation then it does not move during this operation. The control unit may store a record of whether the roof was retracted at the start of this routine, for use in a subsequent luggage space closing routine.
4. A luggage space closing routine. This involves automatically returning the roof to its retracted position if it was retracted when the luggage space was last exposed, and closing the tonneau cover. If the roof was closed when the luggage space was last exposed then it does not move during this operation. When the tonneau cover is closed the luggage space may be inaccessible from the exterior of the vehicle.

The control unit may be responsive to one or more switches 20, 21, 22, 23 in the vehicle's cabin. These switches may trigger routines 1 to 4 respectively. Thus, the vehicle may have a first switch 20/21 for causing the tonneau cover to open in conjunction with retraction or closing of the roof and a second switch 22, different from the first switch, for causing the tonneau cover to open not (depending on the initial condition of the roof) in conjunction with motion of the roof. The switches could in general be any user-actuable control devices.

Figure 3:
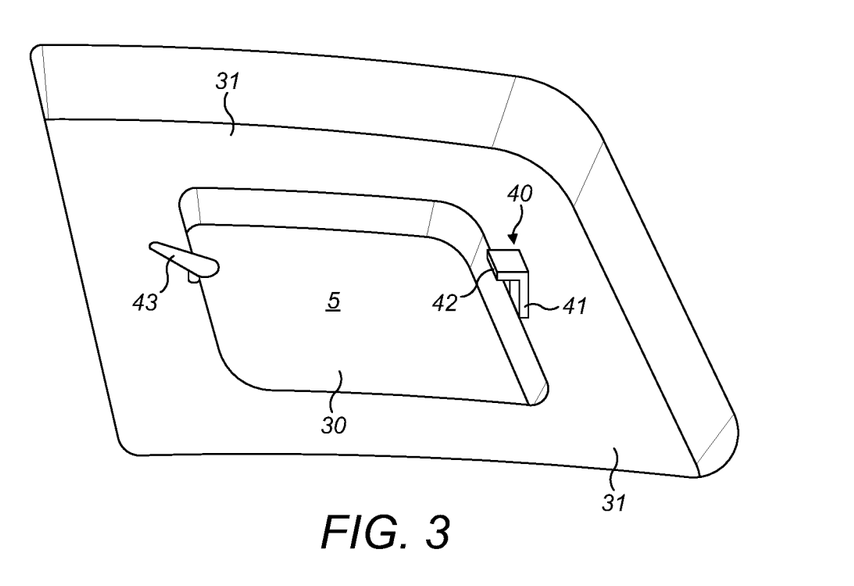
FIG. 3 is a view of a luggage platform of a vehicle from above and one side.
Figure 4:
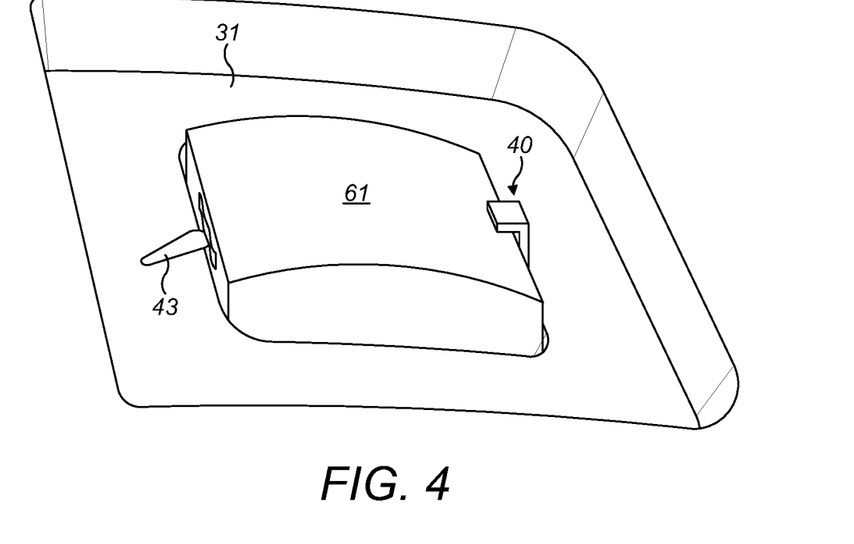
FIG. 4 is a view of a luggage platform of a vehicle from above and one side with an item of luggage in place.

The floor defines a well 30. The well 30 is depressed with respect to a rim 31 of the floor which surrounds the well. (See FIGS. 3 and 4). A side wall 32 extends between the base of the well and the rim. When an item of luggage is placed at least partially in the well, the side wall can help to restrain the luggage against excessive fore/aft or lateral motion with respect to the vehicle.

FIG. 2c shows an item of luggage 61 in place in the luggage space. The item of luggage is located in well 30. The item of luggage is supported by floor 4. The floor may be reinforced (e.g. by ribs 33 running immediately under the floor) to help in supporting the item of luggage. The item of luggage is sized so as to fit snugly within side wall 32. This can help resist X/Y motion of the luggage. In this example the item of luggage is a rigid walled case, but it could be a soft-sided item of luggage. Multiple items of luggage could be located in the luggage space simultaneously. As shown in FIG. 2c, the item of luggage is profiled so that when the roof is retracted it can fit between the floor and the roof. If the underside of the roof (when retracted) is concave, the item of luggage can conveniently be configured so it has a convex outer surface that nests in the concavity of the roof. The upper surface of the luggage may match the curvature of the roof. At least part of the item of luggage, when in the luggage space 5, may be surrounded in the vehicle's X/Y plane by a zone of the roof. Put another way, an upper part of the luggage may project into a volume enclosed around its sides and to above by the roof. The item of luggage may be specifically sized and shaped to fit snugly in the well 30 and close to but not touching the roof. For example, the item of luggage may be sized and shaped so that when it is located home in the well 30 and the roof is stowed at least 50% or at least 75% of its upper surface is located between 5 mm and 30 mm from the underside of the roof. This can help to have the luggage space used efficiently but with limited risk of contact between the roof and the item of luggage. The lower major surface of the item of luggage may be flat. This surface may make broad contact with the floor 4. The upper surface of the item of luggage may be convex. This surface may conform to a concavity defined by the underside of the roof when the roof is retracted.

Figure 5:
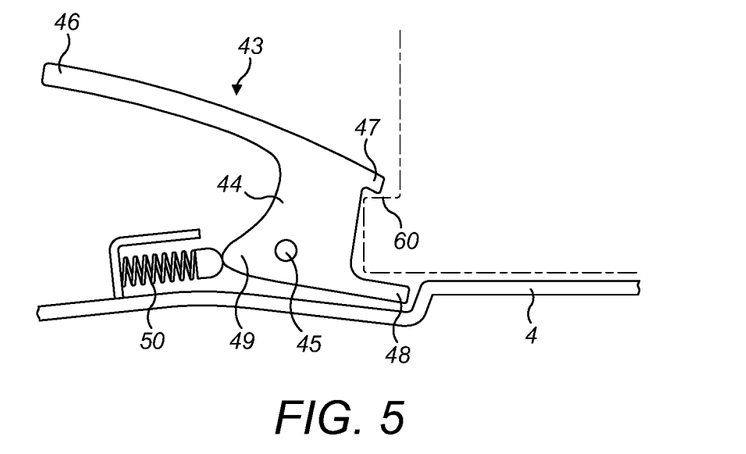
FIG. 5 is a cross-section of a latching mechanism with a latching lever in a latched position.
Figure 6:
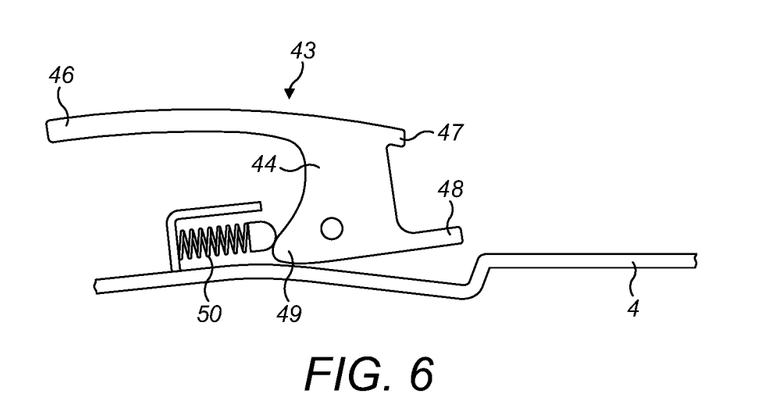
FIG. 6 is a cross-section of a latching mechanism with a latching lever in an unlatched position.

FIGS. 3 to 6 show a latching mechanism for latching an item of luggage in place in the luggage space 5. A bail 40 extends from the floor 4 one on side of the luggage space. The bail has an upright 41 extending upwards from the floor. The upright can bear against a side of the item of luggage to resist horizontal motion (i.e. in vehicle X or Y) of the luggage relative to the vehicle. The bail has a finger 42 extending horizontally from the upright and spaced from the floor. The finger can engage a portion of the item of luggage between itself and the floor, to bear against the luggage in a downwards direction and resist the luggage lifting off the floor. Instead of finger 42, the bail may have a recess into which a part of the item of luggage can be inserted. A clasp 43 is located for engaging the item of luggage on the opposite side of the luggage space 5 from the bail 40. The clasp comprises a lever 44 which is mounted so as to pivot with respect to the floor about a joint 45. The pivot axis is horizontal. The lever 44 is a unitary rigid body which has a handle 46, a claw 47, a lifter 48 and a nib 49. The nib and the handle extend from one side of the lever. The claw and the lifter extend from a second side of the lever. The handle 46 provides an element by which a user can engage the lever to move it between a first position, as shown in FIG. 5, and a second position, as shown in FIG. 6. The nib 49 is borne against by a spring 50. The nib is located so that when the lever moves between the first and second positions the nib compresses and the spring and then at least partially releases it. In this way, the nib and the spring cooperate to restrain the lever stably in the first and second positions. The claw 47 extends towards the middle of the luggage space. An item of luggage is shown by chain-dotted lines in FIG. 5. When the lever is in its first position the claw can bear against an upward-facing shoulder 60 of the item of luggage to restrain the item of luggage from upward motion relative to the vehicle, and to help to keep the item of luggage engaged with the bail 40. The underside of the claw may be angled upwards in the direction away from the luggage space when the lever is in its first position. This can help to resist the item of luggage detaching from it. The lifter 48 extends from a lower part of the lever. When the lever is in its first position the lifter is located on or near the floor 4. The lever can then be moved to its second position to release the item of luggage. When the lever is moved to its second position the lifter rises. When the lever is in its first position the lifter can sit below an item of luggage. When the lever is then moved to its second position the lifter can raise the luggage. This can help a user to grasp the item of luggage and subsequently remove it from the vehicle. It can also indicate to a user that the item of luggage has not been clasped by the lever.

Thus, the item of luggage may be latched in place in the luggage space. The floor may be adapted by the provision of a latch to retain the item of luggage in place in the luggage space. The latch may be dedicated to holding an item of luggage in the luggage space. It may be different from any latch provided for another purpose such as holding the roof in its stowed/retracted position or holding the tonneau cover closed.

The item of luggage may have a handle to help it to be carried. The case may be configured so that the handle faces to the front of the vehicle when the case is engaged by the bail and the lever. If the tonneau cover is hinged from the rear then having the handle at the front can help a user to reach the handle when the tonneau cover is raised.

An engine 70 and/or a gearbox 71 of the vehicle may be located below the floor 4 and/or the luggage space 5. The engine may be located behind the passenger compartment. The vehicle may be a mid-engined or rear-engined vehicle.

The luggage space may be declared as a luggage space for regulatory approval and/or homologation purposes.

The item of luggage may be a bag or a suit case. As an item of luggage it may be intended or adapted for the carrying of personal accoutrements such as clothes. It may have a carrying handle. It may have external wheels. It may have an opening which is articulated (e.g. hinged) or closed by a closure such as a zip, a button, a press-stud or a hook-and-loop fastening. The item of luggage may have a volume greater than 10l The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:
a passenger compartment;
a roof moveable between a first, closed position in which it covers at least part of the passenger compartment and a second, stowed position in which it does not cover the passenger compartment;
a floor located so as to face the underside of the roof when the roof is in the stowed position, the floor being adapted to define a luggage space between it and the roof when the roof is in the stowed position, the floor defining a recess for at least partially receiving an article of luggage, the recess having laterally directed walls for restraining an article of luggage at least partially received in the recess against lateral motion with respect to the vehicle; and
a restraint extending rigidly upwards from the floor for engaging an item of luggage received in the luggage space to thereby restrain the item of luggage against lateral motion with respect to the vehicle, the restraint comprising a laterally extending wall for engaging an item of luggage received in the luggage space to restrain the item of luggage against vertical motion with respect to the vehicle.

2. A vehicle as claimed in claim 1, wherein the floor is provided with one or more reinforcements for supporting an article of luggage in the luggage space.

3. A vehicle as claimed in claim 1, wherein the recess is spaced from the periphery of the floor.

4. A vehicle as claimed in claim 1, comprising a latch mechanism mounted to the floor, the latch mechanism comprising a clasp moveable with respect to the floor for clasping an item of luggage against the floor when the clasp is in a first configuration.

5. A vehicle as claimed in claim 4, wherein the clasp has a second configuration in which a portion of the clasp extends into the luggage space for obstructing an item of luggage from being located home in the luggage space.

6. A vehicle as claimed in claim 1, wherein the roof is mounted to the body of the vehicle by a mechanism such that the underside of the roof when the roof is in its closed position is also the underside of the roof when it is in its stowed position.

7. A vehicle as claimed in claim 1, wherein the underside of the roof in its closed and in its stowed configurations is generally concave.

8. A vehicle as claimed in claim 1, comprising a first user-actuable control and a second user-actuable control, the vehicle being configured to, when the roof is closed:
in response to actuation of the first user-actuable control, open a cover of the luggage space and stow the roof; and
in response to actuation of the second user-actuable control, open a cover of the luggage space without stowing the roof.

9. A vehicle as claimed in claim 8, wherein the cover is configured to cover the roof when the roof is stowed.

10. A vehicle as claimed in claim 1, wherein the luggage space is located behind the passenger compartment.

11. A vehicle as claimed in claim 1, the vehicle being a mid-engined or rear-engined automobile.

12. A set of travel equipment comprising:
a vehicle as claimed in claim 1; and
an item of luggage configured to be accommodated in the luggage space.

13. A travel set as claimed in claim 12, wherein the item of luggage is hard-sided and configured so that it nests with the roof when the item of luggage is located home with respect to the floor in the luggage space and the roof is in its stowed configuration.

14. A travel set as claimed in claim 13, wherein the item of luggage is configured so that when it is located home with respect to the floor and the roof is in its stowed configuration the vertical spacing between the upper surface of the item of luggage and the underside of the roof is between 5 mm and 20 mm over the majority of the upper surface of the item of luggage.

15. A method for storing an item of luggage in a vehicle as claimed in claim 1, the method comprising storing the item of luggage in the luggage space.

16. A vehicle comprising:
a passenger compartment;

a roof moveable between a first, closed position in which it covers at least part of the passenger compartment and a second, stowed position in which it does not cover the passenger compartment; and a floor located so as to face the underside of the roof when the roof is in the stowed position, the floor being adapted to define a luggage space between it and the roof when the roof is in the stowed position, the floor defining a recess for at least partially receiving an article of luggage, the recess having laterally directed walls for restraining an article of luggage at least partially received in the recess against lateral motion with respect to the vehicle; and wherein the vehicle is a mid-engined or rear-engined automobile.

* * * * *